(12) United States Patent
Ciani et al.

(10) Patent No.: US 10,443,847 B2
(45) Date of Patent: Oct. 15, 2019

(54) DILUTION GAS OR AIR MIXER FOR A COMBUSTOR OF A GAS TURBINE

(71) Applicant: Ansaldo Energia Switzerland AG, Baden (CH)

(72) Inventors: Andrea Ciani, Zürich (CH); Adnan Eroglu, Untersiggenthal (CH)

(73) Assignee: ANSALDO ENERGIA SWITZERLAND AG, Baden (CH)

( * ) Notice: Subject to any disclaimer, the term of this patent is extended or adjusted under 35 U.S.C. 154(b) by 559 days.

(21) Appl. No.: 14/837,039

(22) Filed: Aug. 27, 2015

(65) Prior Publication Data

US 2016/0069568 A1    Mar. 10, 2016

(30) Foreign Application Priority Data

Sep. 8, 2014    (EP) .................................... 14183914

(51) Int. Cl.
*F23R 3/04* (2006.01)
*F23R 3/34* (2006.01)
(Continued)

(52) U.S. Cl.
CPC ................ *F23R 3/045* (2013.01); *F02C 3/20* (2013.01); *F02C 9/18* (2013.01); *F23C 6/04* (2013.01);
(Continued)

(58) Field of Classification Search
CPC .. F23R 3/04; F23R 3/045; F23R 3/346; F23R 3/002; F23R 2900/03341; F02C 7/141;
(Continued)

(56) References Cited

U.S. PATENT DOCUMENTS 2,332,866 A    10/1943  Max
3,304,713 A *   2/1967  Szydlowski ............ F23R 3/045
                                                     60/745
(Continued)

FOREIGN PATENT DOCUMENTS

CN    1058262 A    1/1992
CN    1121570 A    5/1996
(Continued)

OTHER PUBLICATIONS

First Office Action dated Oct. 24, 2018 in corresponding Chinese Patent Application No. 201510565061.7, and an English translation thereof.

*Primary Examiner* — Alain Chau
(74) *Attorney, Agent, or Firm* — Buchanan Ingersoll & Rooney PC (57) ABSTRACT

A sequential combustor arrangement including a first burner, a first combustion chamber, a mixer for admixing dilution air to hot gases leaving the first combustion chamber during operation, a second burner, and a second combustion chamber arranged sequentially in a fluid flow direction. The mixer guides combustion gases in a hot gas flow path extending from the first combustion chamber. The second burner including a duct having an inlet for connection to the first combustion chamber and an outlet for connection to the second burner. The mixer includes injection pipes pointing inwards from the side walls for admixing the dilution air to cool the hot gases leaving the first combustion chamber. The injection pipes are distributed circumferentially along the side wall of the mixer. The injection pipes have a conical or quasi-conical shape addressed to the center of the mixer.

14 Claims, 5 Drawing Sheets

(51) Int. Cl.
*F02C 3/20* (2006.01)
*F23C 6/04* (2006.01)
*F02C 9/18* (2006.01)
*F23R 3/00* (2006.01)
*F23R 3/42* (2006.01)

(52) U.S. Cl.
CPC ............ *F23R 3/002* (2013.01); *F23R 3/34* (2013.01); *F23R 3/346* (2013.01); *F23R 3/42* (2013.01); *F05D 2220/32* (2013.01); *F05D 2240/35* (2013.01); *F05D 2240/40* (2013.01); *F23R 2900/03341* (2013.01)

(58) Field of Classification Search
CPC ...... F02C 3/30; F02C 3/20; F02C 9/18; F05D 2220/32; F05D 2240/35; F05D 2240/40; F23C 6/00; F23C 6/04–6/047
See application file for complete search history.

(56) References Cited

U.S. PATENT DOCUMENTS

| | | | | |
|---|---|---|---|---|
| 3,899,882 | A | * | 8/1975 | Parker .................. F23R 3/045 431/352 |
| 4,590,769 | A | | 5/1986 | Lohmann et al. |
| 4,887,432 | A | * | 12/1989 | Mumford .............. F23R 3/045 60/759 |
| 5,125,227 | A | | 6/1992 | Ford et al. |
| 5,498,155 | A | * | 3/1996 | Chyou ................ F15D 1/0015 431/182 |
| 5,513,982 | A | * | 5/1996 | Althaus ................ B01F 5/0451 431/182 |
| 5,626,017 | A | | 5/1997 | Sattelmayer |
| 5,658,358 | A | * | 8/1997 | Chyou ................ B01F 5/0473 138/37 |
| 5,735,126 | A | * | 4/1998 | Schulte-Werning ...... F23R 3/04 431/350 |
| 8,607,573 | B2 | | 12/2013 | Miura et al. |
| 8,966,907 | B2 | | 3/2015 | Khan et al. |
| 9,441,837 | B2 | | 9/2016 | Pasqualotto et al. |
| 2010/0122537 | A1 | * | 5/2010 | Yankowich ............. F23R 3/005 60/754 |
| 2012/0260622 | A1 | * | 10/2012 | Poyyapakkam .......... F23C 5/08 60/39.465 |
| 2012/0260665 | A1 | * | 10/2012 | Eroglu .................... F23R 3/286 60/774 |
| 2014/0033728 | A1 | * | 2/2014 | Marmilic ................ F02C 7/141 60/772 |
| 2014/0109591 | A1 | * | 4/2014 | Bothien .................. F02C 6/02 60/791 |
| 2015/0167980 | A1 | * | 6/2015 | Pent ....................... F23R 3/16 60/746 |
| 2015/0369488 | A1 | * | 12/2015 | Singh ...................... F23R 3/10 60/726 |

FOREIGN PATENT DOCUMENTS

| | | | |
|---|---|---|---|
| CN | 101294714 | A | 10/2008 |
| CN | 103375814 | A | 10/2013 |
| CN | 103542412 | A | 1/2014 |
| DE | 102 14 574 | A1 | 10/2003 |
| DE | 103 12 971 | A1 | 12/2004 |
| EP | 0 321 809 | A1 | 6/1989 |
| EP | 0 620 362 | A2 | 10/1994 |
| EP | 0 794 657 | A2 | 9/1997 |
| GB | 578764 | A * | 7/1946 ............. F23R 3/045 |
| GB | 579 424 | A | 8/1946 |
| GB | 819 065 | A | 8/1959 |
| GB | 2 003 989 | A | 3/1979 |
| WO | 2014/063835 | A1 | 5/2014 |

\* cited by examiner

DILUTION GAS OR AIR MIXER FOR A COMBUSTOR OF A GAS TURBINE

CROSS-REFERENCE TO RELATED APPLICATION

This application claims priority of EP Application No. 14183914.2 filed Sep. 8, 2014, the contents of which are hereby incorporated in its entirety.

TECHNICAL FIELD

The invention relates to the technical field of gas turbines with sequential combustion. In particular, the invention refers to a sequential combustor arrangement with a means for admixing dilution gas or air into a hot gas stream.

In addition, the invention refers to a method for operating a gas turbine having means for admixing dilution gas or air into the hot gas stream in a sequential combustor.

Accordingly, this invention refers to a sequential combustor arrangement comprising a first burner, a first combustion chamber, a mixer for admixing a dilution gas or air to the hot gases leaving the first combustion chamber during operation, a second burner, and a second combustion chamber arranged sequentially in a hot gas path of a gas turbine with sequential combustion.

The mixer is adapted to guide combustion gases in a hot gas flow path extending between the first combustion chamber and the second burner comprising a duct having an inlet at an upstream end adapted for connection to the first combustion chamber and an outlet at a downstream end adapted for connection to the second burner.

BACKGROUND OF THE INVENTION

Premix burners for the combustor of a gas turbine are disclosed e.g. in the documents EP 0 321 809 and EP 0 704 657.

In particular, said premix burners can be operated with liquid and/or gaseous fuels of all kinds. Thus, it is possible to operate burners or combustors simultaneously or in sequence with different fuels.

Gas turbines with sequential are shown in EP 0 620 362 A1 or DE 103 12 971 A1.

Additional relevant state of the art is disclosed in the following documents.

EP 0 321 809 A1 relates to a burner consisting of two hollow conical half-shells, forming tangential air inlet slots and feed channels for gaseous and liquid fuels, whereby the center axes of the hollow conical half-shells run in the longitudinal direction at a mutual offset. A fuel nozzle, which is located in the middle of the connecting line of the mutually offset center axes of the half-shells, is placed at the burner head within the conical interior space formed by the half-shells.

EP 0 704 657 A1 describes a burner arrangement for a heat generator, substantially consisting of a swirl generator, as disclosed in EP 0 321 809 A1, for a combustion air flow and means for injecting fuel into said air flow, and a mixing zone downstream of said swirl generator for homogenously mixing fuel and combustion air before introducing the fuel-air-mixture into a combustion chamber, where ignition occurs.

It is a fact, that referring to gas turbine engine a flexibility with respect to the operational process is required. This implies that gas turbine engines often operate at lower load than the base load design point, i.e. at lower combustor inlet and firing temperatures.

At the same time, emission limit values and overall emission permits are becoming more stringent, so that it is required to operate at lower emission values, keep low emissions also at part load operation and during transients.

State-of-the-art combustion systems are designed to cope with a certain variability in operating conditions, e.g. by adjusting the compressor inlet mass flow or controlling the fuel split among different burners, fuel stages or combustors. However, this is not sufficient to meet the new requirements.

To further reduce emissions referring to the operational flexibility, a sequential combustion has been suggested in DE 103 12 971 A1. Depending on the operating conditions, in particular on the hot gas temperature of a first combustion chamber, it can be necessary to cool the hot gases before they are admitted to a second burner (also called sequential burner). This cooling can be advantageous to allow fuel injection and premixing of the injected fuel with the hot flue gases of the first combustor in the second burner.

Conventional cooling methods either require heat exchangers which lead to high pressure drops in the main hot gas flow or suggest injection of a cooling medium from the side walls. For injection of a cooling medium from the side walls a high pressure drop is required which is detrimental to the efficiency of a gas turbine operated with such a combustor arrangement and a controlled cooling of the whole flow is difficult.

With reference to WO 2014/063835 A1 a sequential combustor arrangement is disclosed, comprising a first burner, a first combustion chamber, a mixer for admixing a dilution gas to the hot gases leaving the first combustion chamber during operation, a second burner, and a second combustion chamber arranged sequentially in a fluid flow direction. The mixer is adapted to guide combustion gases in a hot gas flow path extending between the first combustion chamber and the second burner comprising a duct having an inlet at an upstream end adapted for connection to the first combustion chamber and an outlet at a downstream end adapted for connection to the second burner.

The mixer comprises a plurality of injection pipes pointing inwards from the side walls of the mixer for admixing the dilution gas to cool the hot flue gases leaving the first combustion chamber.

In addition, WO 2014/063835 A1 describes a method for operating a gas turbine with at least a compressor, a combustor arrangement comprising a first burner, a first combustion chamber, a mixer for admixing a dilution gas to the hot gases leaving the first combustion chamber during operation, a second burner and a second combustion chamber arranged sequentially in a fluid flow connection. The mixer is adapted to guide combustion gases in a hot gas flow path extending between the first combustion chamber and the second burner comprising a duct having an inlet at an upstream end adapted for connection to the first combustion chamber and an outlet at a downstream end adapted for connection to the second burner. The mixer comprises a plurality of injection pipes pointing inwards from the side walls of the duct for admixing the dilution gas to cool the hot flue gases leaving the first combustion chamber, and a turbine. The dilution gas is admixed into different regions of the cross section of the mixer or the dilution gas is injected through injection holes and/or second injection pipes and first injection pipes in order to introduce dilution gas into different regions of the cross section of the mixer.

Moreover, the solution according to WO 2014/063835 A1, referring to the cross-flow injection system, offers also the advantage of a simpler geometry and lower cost. However, such solution needs longer mixing length and is much more sensitive with respect to changes in the hot gas temperature of the first combustor and dilution air temperature, associated with the change in engine load.

SUMMARY OF THE INVENTION

According to a first aspect, the present invention refers to a cooling enhancement preferably in connection with a mixing section with at least one mixer arrangement for a sequential burner, preferably being actively connected to a CPSC (Constant Pressure Sequential Combustor).

The sequential burner performances (NOx, CO, OTDF, FBM=Flashback Margin) are very sensitive to the burner inlet temperature profile and its average temperature. To match such requirements a first stage combustor is used to generate a hot gas, which has to be cooled to a lower temperature level by injecting a cooler medium, i.e. dilution gas or air. Such mixing processus is crucial to achieve the best temperature distribution. But it has to be taken the existing strong restriction in mixing time and mixing length. Additionally, the thermo-acoustic behavior, i.e. pulsations, may strongly be influenced by the mixer.

A sequential combustor arrangement according to the disclosure of the present invention comprises a first burner, a first combustion chamber, a mixing device, i.e. a mixer, for admixing a dilution air to the hot gases leaving the first combustion chamber during operation, a second burner, and a second combustion chamber arranged sequentially in a fluid flow connection, wherein the mixer is adapted to guide combustion gases in a hot gas flow path extending between the first combustion chamber and the second burner comprising a duct having an inlet at an upstream end adapted for connection to the first combustion chamber and an outlet at a downstream end adapted for connection to the second burner Basically, the CPSC concept consists of the hot gas generator, the mixer with a series of pipes, sequential burner and sequential liner. The mixer concept in connection with the features of the invention is used to create the suitable sequential burner inlet profile by mixing the dilution air and the cooling air with the hot gas flow from the first combustor (HG). Generally, the mixer wall and mixer jet tubes are cooled with a convective cooling technique and/or an effusion cooling technique and/or an impingement cooling technique.

Effusion cooling techniques are applied on the mixer because not only good cooling of the mixer wall is required, but it is also simultaneously necessary to provide mixing of the cooling air in connection with the main hot gas flow to deliver suitable inlet hot gas profile for reheat combustion.

Accordingly, the focused object of the present invention is to propose a mixer for a sequential burner combustor arrangement with a mixing section for admixing dilution air between the first combustion chamber and the second burner.

The dilution medium, preferably dilution air, is admixed in the mixing section of the mixer to provide proper inlet flow conditions for the second burner. In particular, the hot gases are cooled to a predetermined temperature profile.

The performance of the mixer tube (arrangement) referring to cooling and mixing are improved by the implementation of a series of injection pipes or other similar components, for example mixing tubes, which are mounted radially and fed by an outer plenum with dilution air. These features would essentially help to avoid the flow separation within the mentioned components and improve the circumferential mixing quality.

Thus, the sequential combustor arrangement of the present invention comprises a first burner, a first combustion chamber, a mixer arrangement for admixing a dilution air to the hot gases leaving the first combustion chamber during operation, a second burner, and a second combustion chamber arranged sequentially in a fluid flow connection. The mixer is adapted to guide combustion gases in a hot gas flow path extending between the first combustion chamber, wherein the second burner comprising a duct having an inlet at an upstream end adapted for connection to the first combustion chamber and an outlet at a downstream end adapted for connection to the second burner. The mixer comprises at least one group of injection pipes pointing inwards from the side walls of the mixer for admixing the dilution air to cool the hot flue gases leaving the first combustion chamber. The injection pipes are distributed circumferentially along the side wall of the mixer and have a conical or quasi-conical shape decreasing towards the center of the mixer.

Additionally, the quasi-conical shape of the injection pipes consists of multiple jointed tubes with an individual decreasing cross-sectional area along their radial or quasi-radial extension. Then, the injection pipes are arranged to cover at regular or irregular intervals the full cross-sectional area of the mixer with dilution air being injected into the hot gas flow, and the injection pipes comprising along their protrusion depth a number of injection holes used to inject orthogonally or quasi-orthogonally the dilution air into the hot gas flow. Furthermore, the injection pipes have a uniform or nonuniform conical gradient along the respective protrusion depth. Moreover, the injection pipes can be inclined in the hot gas flow direction.

The mixer comprises in the hot gas flow direction at least one row of injection pipes with equal, similar or different protrusion depth, wherein the mixer comprises multiple rows of injection pipes in the hot gas flow direction with equal, similar or different protrusion depth.

The protrusion depth of the injection pipes of a first row is closer to the center of the mixer than the protrusion depth of a second row, then, the protrusion depth of the second row is closer or farther to the center of the mixer than the protrusion depth of a third row, wherein the injection pipes of the individual rows extend towards the center of the mixer and are arranged in radial direction inversely to each other.

At least one injection pipe group is circumferentially distributed along the side wall of the mixer and has a staggered design relative to a plane normal to the main flow direction of the hot gases flowing through the mixer, wherein the stagger is between 0.1 and 3.5 times the diameter of the injection pipes.

At least a part of the outer surface of the injection pipes and/or at least a part of the inner surface of the side wall of the mixer is coated with TBC, and the injection pipes are equipped with cooling ribs and/or a pin field, arranged on the inner surface of the injection pipes.

Finally, the invention refers to a method for operating a gas turbine, comprising at least one compressor, a sequential combustor arrangement, comprising a first burner, a first combustion chamber, a mixer arrangement for admixing a dilution air to the hot gases leaving the first combustion chamber during operation, a second burner, and a second combustion chamber, arranged subsequently in fluid flow direction. The mixer is adapted to guide combustion gases in the hot gas flow path extending between the first combustion chamber and the second burner, comprising a duct having an inlet at an upstream end adapted for connection to the first combustion chamber and an outlet at a downstream end adapted for connection to the second burner. The mixer comprises at least one group of injection pipes pointing inwards from the side walls of the mixer for admixing the dilution air to cool the hot flue gases leaving the first combustion chamber, wherein the injection pipes are arranged circumferentially along the side wall of the mixer and wherein the injection pipes have a conical or quasi-conical shape decreasing towards the center of the mixer.

According to a further preferred embodiment the mixer arrangement comprises a plurality of injection pipes, which are pointing in circumferentially direction inwards from the wall of the duct for admixing the dilution air to the hot flue gases, leaving the first combustion chamber and cooling them to provide appropriate inlet conditions for the second combustor.

Each injection pipe is also equipped with a large number of injection holes in radial and circumferential direction, used to inject the dilution gas or air into the mentioned hot gas flow.

The diameter, length, geometrical design and number of these injection pipes are designed to admit dilution air into the hot gas flow such that the required local mass flow and temperature drop are achieved with a low pressure drop.

Typically the injection pipes allow admixing of dilution air with a pressure drop of preferably 0.4% to 2% of the total pressure of the dilution air pressure before admixing. With a low pressure drop at the inlet of the injection pipes, a pressure drop preferably of 0.2% to 1% of the total pressure of the dilution air pressure before admixing can be sufficient. To reduce the inlet pressure drop rounded pipe inlets, cross-section stepped pipes, conical or tapered pipes etc. can be used.

A combination of said elected injection pipes may be provided. Moreover, it can be provided a mixer arrangement having injection pipes with different protrusion depth into the hot gas flow with respect to the side wall.

For example the protrusion depth of the first injection pipe arrangement in hot gas flow is greater than the intrusion depth of the second injection pipe arrangement. The grading may also collect the following injection pipe arrangements, wherein the rate is adapted to the operating conditions.

Furthermore, it has to be considered that a large amount of absolute cylindrical injection pipes with a large cross-section circumferentially distributed along the inner wall of the mixer will obstruct a large portion of the hot gas cross sectional area and thereby create a high pressure drop. For example, with conically decreasing injection pipes the blockage area can be substantially reduced.

The cone angle of the injection pipes should be chosen so that the velocity of the dilution air velocity inside the injection pipes is maintained constantly or quasi-constantly, despite part of this dilution air is being injected.

Additional findings related to the invention concern the following aspects:

High local inlet temperatures may result in high emissions (in particular NOx, CO, and unburned hydrocarbons) and/or flashback margin in the second combustor. Flashback margin and NOx are induced by the reduced self-ignition time for the injected fuel due to a high inlet gas temperature or high oxygen concentration, which causes earlier ignition (leading to flashback margin) or reduced time for fuel air mixing resulting in local hot spots during combustion and consequently increasing NOx emission.

Low temperature regions can cause CO emissions, due to the increased self-ignition time. This can reduce the time for CO to $CO_2$ burnout, and a reduced local flame temperature, which it can further slowdown the CO to $CO_2$ burnout. Finally local hot spots may lead to overheating of certain parts downstream of the mixer.

A local high oxygen concentration can have a similar effect as a local high temperature, e.g. fast reaction reducing the time for mixing, high combustion temperatures, increased NOx emissions and possibly flashback margin. Theoretically, a local low oxygen concentration can have a similar effect as a local low temperature, e.g. slow reaction leading to increased CO and UHC (unburned hydrocarbon) emissions, but in reality: low $O_2$-▶ higher fuel/air ratio-▶ higher T-▶ higher reaction rate.

A high or low local inlet velocity can lead to increased or reduced residence time in the second burner and subsequent second combustion chamber, which has similar negative effects as inhomogeneous self-ignition times, e.g. a reduced residence time in the second burner can lead to incomplete mixing and high NOx. A reduced residence time in the second combustor can lead to incomplete combustion resulting in increased CO emissions. A reduced flow velocity in the second burner can lead to early ignition and flash back.

Further important requirements from an aerodynamic point of view are the minimised pressure loss in the hot gas path and the dilution air supply. Both can impact the performance of a gas turbine operating with such a sequential combustor arrangement.

To direct shear stress into the flow while passing through the mixing zone of the reheat burner, the corresponding flow channel of the mixing zone provides different cross sectional areas in flow direction with continuously changing shape and/or provides non circular cross section areas.

The mixer arrangement according to the present invention comprises a deflector or another means for a regulated discharge of a portion of dilution air flow by built-in means, for example using a flow separation component inside the injection pipe. The pipes can be supplied with an individual portion of dilution air.

The various injection pipes can also be supplied with an identical, a similar or a different mass flow of dilution air.

The volume (VD) between the deflector and the plenum wall can be used to install a damper.

The mixer arrangement is preferably arranged with an annular flow section, whereas the height of the annular flow section is the difference between the diameter of an annular wall of the annular flow section and the inner wall of the annular flow section.

The dimension of the deflector with respect to its radial height depends on the flow cross section of the connecting duct.

According to another embodiment of the mixer arrangement the injection pipe comprises a wall preferably arranged along the whole longitudinal direction of the injection pipe, this wall being located outside or quasi-outside of the center of the cross section of the pipe. This arrangement may be provided in connection with a single injection pipe or in conjunction with the above described deflection guide.

According to a further embodiment the sequential combustor arrangement comprises a mixer arrangement with a plurality of sequential disposed injection pipes with at least one deflector, which is intermediary disposed to the injection pipes or downstream of the last injection tube along the dilution air flow, in accordance with a cascade principle, wherein for each deflector corresponding injection pipes are arranged upstream, for admixing the dilution air to cool the hot flue gases leaving the first combustion chamber.

With a sequential arrangement the injection pipes of each group are preferably arranged circumferentially distributed along the side wall of the mixer arrangement, wherein the injection pipes of the first group have a first protrusion depth into the hot gas flow path and the injection pipes of the second group have the same or a reduced protrusion depth; this also applies to the following injection pipe groups.

In such an embodiment, but not exclusively, it may be provided that the deflector or deflection guide consists of a single flange-like body which is arranged in the circumferential direction of the mixer arrangement.

For injection pipes arranged normal to the side wall, the length of the injection pipes extending into the hot gas path is equal to the protrusion depth.

Furthermore, the above mentioned wall may be arranged off-center such or may be supplemented with additional means, that the formed space located downstream of the dilution air flow remains separated from the air flow along the injection pipe.

According to one embodiment of the sequential combustor arrangement the duct wall is at least partly effusion cooled. Due to admixing of dilution air the average temperature of the hot gas in the mixer is reduced downstream of the injection pipes. Typically, a reduced cooling requirement and less diffusion cooling are expected. However, due to locally increased turbulence the heat load on the side wall downstream of an injection pipe can be increased.

Therefore, a first effusion cooled region is situated downstream of first injection pipes, and upstream of an array of subsequent injection pipes, wherein the number of effusion cooling holes per unit area can be increased.

Downstream of the last injection pipe, preferably in connection with a deflection guide, the hot gas temperature can be reduced to a level where no effusion cooling is required, whereby other cooling methods can be applied.

According to another embodiment the first effusion cooled region has a trapezoidal shape with its base being normal to the main flow direction of the hot gases, and wherein the downstream base of the trapezoidal first region is longer than the upstream base of the trapezoidal first region.

In a further embodiment the effusion cooling holes have a diameter in a range from 0.5 to 1.2 mm. Further the distance between neighbouring effusion cooling holes is in a range from 3 to 10 mm in the first region and in a range from 6 to 20 mm in the second region.

According to one embodiment of the mixer arrangement first injection pipes are arranged upstream of further injection pipes with or without a deflection guide, when such an arrangement is provided.

Such an arrangement allows the injection of dilution air to different regions of the mixer arrangement with minimum interference between the dilution air injected by differently designed injection pipes, for example in connection with a single pipe, or a pipe with a deflection guide, or a pipe with a wall to split the dilution air flow, or a pipe with a wall to prevent flow separation.

Furthermore, when the arrangement comprising a number of injection pipes with a corresponding deflection guide, the first group of injection pipes can be arranged downstream of the second group of injection pipes. Referring to an arrangement where the shorter injection pipes are upstream of the longer injection pipes, the dilution air injected by the short injection pipes reduces the heat load with respect to the subsequent longer injection tubes.

According to one embodiment of the mixer arrangement the diameter of the first group of injection pipes in connection with a deflection guide is larger than the diameter of the injection pipes of the second group. Furthermore, the diameter of the second group of injection pipes can be larger than the diameter of the injection pipes of the third group.

The same designs can also be provided, if the injection pipes have a wall with different functions.

Referring to another embodiment the first injection pipes within the mixer arrangement are arranged circumferentially distributed along the side wall of the mixer in a plane normal or oblique with respect to the main flow direction of the hot gases flowing through the mixer; this also applies to the subsequent groups of the injection pipes.

Such an embodiment may be provided in connection with the deflection guide, which consists of a single flange-like body arranged in the circumferential direction of the mixer.

The injection pipe(s) and the deflection guide (if available) of the mixer arrangement are exposed to the hot gases leaving the first combustion chamber. The injection pipe(s) and the deflection guide are inherently cooled by the dilution air which is flowing through them. However, to increase life time of the injection pipe(s) and deflection guide additional measures to reduce the thermal exposition of them can be applied.

Therefore, according to one embodiment of the mixer arrangement at least a part of the outer surface of the injection pipes(s) and deflection guide can be coated with TBC. Additionally, at least a part of the inner surface of the side wall of the mixer can be coated with TBC to reduce the cooling requirements of the wall, and thereby to avoid cool peripheral regions in the hot gas flow leaving the mixer.

In one embodiment the heat transfer coefficient on the inside of the pipe(s) and deflection guide is increased. For increased heat transfer cooling ribs and/or a pin field can be arranged on the inner surface of the injection pipes(s) and deflection guide.

In a further embodiment the injection pipes in connection with the deflection guide are inclined at an angle of less than 90° relative to the flow direction of the hot gases such that the dilution air leaving the pipes have a flow component in the direction of the hot gas flow at the location of injection.

The injection pipes can be inclined at an angle such that the axial component of the dilution air leaving the pipes is equal to or within +/−50% of the axial flow velocity of the hot gas flow at the location of injection.

The number of injection pipes can, for example, be chosen such that the distance between the exit-openings of neighbouring injection pipes in two groups are similar. Similar in this context can mean that the distance between exit openings referring to the group with a larger penetration depth corresponds to one to three times the distance with respect to the group with smaller penetration depth. The distance between exit openings can further be increased with the exit diameter of the injection pipes.

In addition, a method for operating such a gas turbine is subject of the present invention. Dilution air can be admixed to the hot gases in the mixer in such a manner that it results a sustained cooling process. According to one embodiment dilution air is admixed into different regions of the mixer via the various injection pipes.

In one embodiment the injection pipes of the first group are arranged to admit dilution air towards the central region of the hot gas flow path.

Effusion cooling may be used to cool the combustor walls and/or side walls of the mixing section.

Downstream of the dilution air injection mixing between dilution air and hot gas can be enhanced by a contraction of the flow path.

Referring to a sequential combustion the combination of combustors may be disposed as follows:

The first and the second combustion chambers may be arranged in a can-can-combustor architecture, i.e. the first combustion chamber and second combustion chamber are designed as can-combustion chambers.

The first and the second combustion chambers may be arranged in a can-annular-combustor architecture, i.e. the first combustion chamber is arranged as an annular combustion chamber and the second combustion chamber is arranged as can-combustion chamber.

The first and the second combustion chambers may be arranged in an annular-can-combustor architecture, i.e. the first combustion chamber is arranged as can combustion chamber and the second combustion chamber is arranged as an annular combustion chamber.

The first and the second combustion chambers may be arranged in an annular-annular-combustor architecture, i.e. the first combustion chamber and the second combustion chamber are annular combustion chambers.

Accordingly, the mixing quality of the mixer is crucial since the burner system of the second combustion chamber requires a prescribed inlet temperature and inlet velocity profile.

The main advantages of the invention are the following:
1. More efficient mixing requiring less mixing time and mixing length, i.e. better mixing and performances, shorter mixer arrangement.
2. More stable mixer exit profiles, i.e. less thermo acoustic problems (pulsations).
3. Uniform injection velocity, i.e. better mixing with low pressure drop, i.e. better performances.
4. Elimination of Strouhal instability through varying tube diameter, i.e. more stable combustion (less pulsation, less sensitive to BC changes)

BRIEF DESCRIPTION OF THE FIGURES

The disclosure, its nature as well as its advantages, shall be described in more detail below with the aid of the accompanying figures. Referring to the figures.

DETAILED DESCRIPTION

Figures 1, 2:
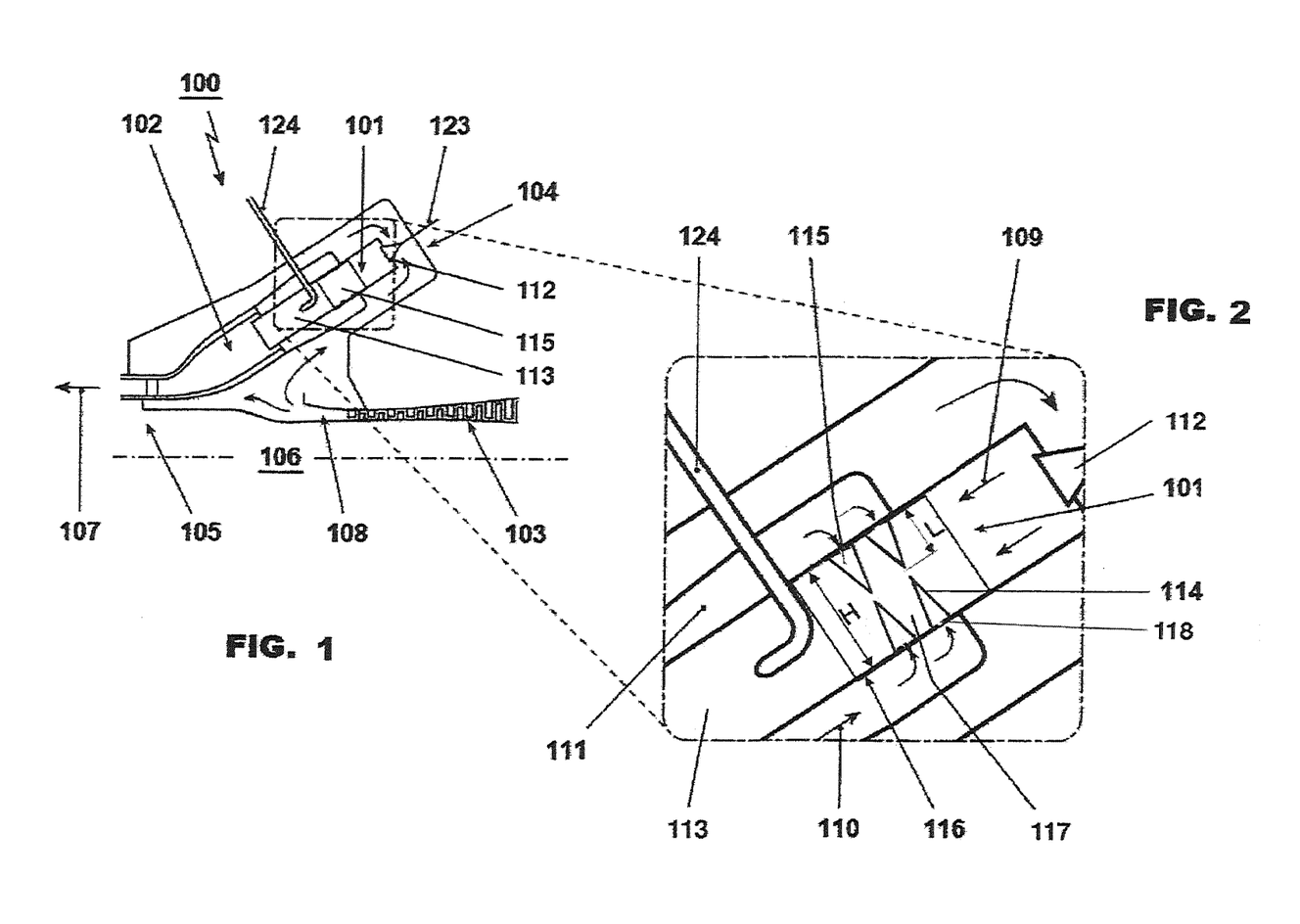
FIG. 1 shows a generic gas turbine using sequential combustion with a mixer arrangement for admixing dilution air.
FIG. 2 shows a mixer arrangement with first and second injection pipes.

FIG. 1 shows a gas turbine 100 with a sequential combustor arrangement 104 according to one exemplary embodiment of the invention. It comprises a compressor 103, a combustor arrangement 104, and a turbine 105. The combustor arrangement 104 comprises a first burner 112, a first combustion chamber 101, and a mixer arrangement 117 for admixing a dilution air 110 to the hot gases leaving the first combustion chamber 101 during operation.

Downstream of the mixer 117 the combustor arrangement 104 further comprises a second burner 113, and a second combustion chamber 102. The first burner 112, first combustion chamber 101, mixer 117, second burner 113 and second combustion chamber 102 are arranged subsequently in a fluid flow direction. Fuel can be introduced into the first burner 112 via a first fuel injection 123, mixed with compressed air which is compressed in the compressor 103, and combusted in the first combustion chamber 101.

Dilution air 110 (see FIG. 2) is introduced into the subsequent mixer 117. Additional fuel can be introduced into the second burner via a second fuel injection 124, mixed with hot gases leaving the mixer 117, and combusted in the second combustion chamber 102. The hot gases leaving the second combustion chamber 102 are expanded in the subsequent turbine 105, performing work. The turbine 105 and compressor 103 are arranged on a shaft 106.

The remaining heat of the exhaust gas 107 leaving the turbine 105 can be further used in a heat recovery steam generator or boiler (not shown) for steam generation.

In the shown example, compressor exit gas is admixed as dilution air 110. Typically the compressor exit gas is compressed ambient air. For gas turbines with flue gas recirculation (not shown) the compressor exit gas is a mixture of ambient air and recirculated flue gas.

Typically, the gas turbine system includes a generator (not shown) which is coupled to a shaft 106 of the gas turbine 100.

Different exemplary embodiments of the mixer 117 are shown in WO 2014/063835 A1, FIGS. 2a to 2d as an enlarged section of the FIGS. 1a to 1d, wherein the mentioned Figures form an integral part of this description.

FIG. 2 shows a first example with a mixer comprising first injection pipes 114 which are arranged upstream of second injection pipes 115. Two injection pipe groups with a length L, are shown here.

In this example compressed gas from the compressor plenum is guided along the combustor liner within a connection duct 111 as dilution air 110. From the connection duct 111 the dilution air 110 is injected into the mixer via the first injection pipes 114 and second injection pipes 115. The mixer 117 has a cross section with a height H. The mixer can be arranged with an annular cross section. For an annular mixer the height H results from the difference between the diameter of an outer wall of the annular flow section and the inner wall of the annular flow section. For a mixer with a cylindrical cross section the height H is the diameter of the cross section. The length L of the first injection pipes 114 and the second injection pipes 115 is defined in such a way that good mixing of the injected dilution air 110 with the hot gas leaving the first combustion chamber 101 is assured.

FIG. 2 shows the mixer 117 comprising dilution air apertures 118 into the injection pipes 114, 115. The use of dilution air apertures 118 can reduce the pressure drop of the hot gas flow in the mixer 117. It can for example be used if the height H is small enough to allow good mixing with admixing of dilution air 110 through the first injection pipes 114 with a length L and dilution air apertures injection 118.

To reduce the pressure loss in the hot gas flow the mixer is arranged with diverging side walls 116 in the region of the mixer where dilution air is admixed. Due to the diverging side walls 116 the cross section of the mixer can be increased according to a diffusor.

This increases the cross section and leads and reduces the flow velocity, and a reduction of the pressure drop caused by the first injection pipes 114 and second injection pipes 115. Furthermore, these measures reduce the pressure drop induced by injection dilution air 110 into the hot gas flow 109.

A further embodiment consists in directly supplying the dilution air 110 to the first injection pipes 114 and second injection pipes 115 from the compressor plenum (downstream of the compressor 103). The first injection pipes 114 and the second injection pipes 115 are extending into the compressor plenum and therefore dilution air 110 with a higher pressure and lower temperature (no temperature pick-up due to the cooling of the combustor before use as dilution gas) is available (see WO 2014/063835, FIG. 2d).

Figure 3:
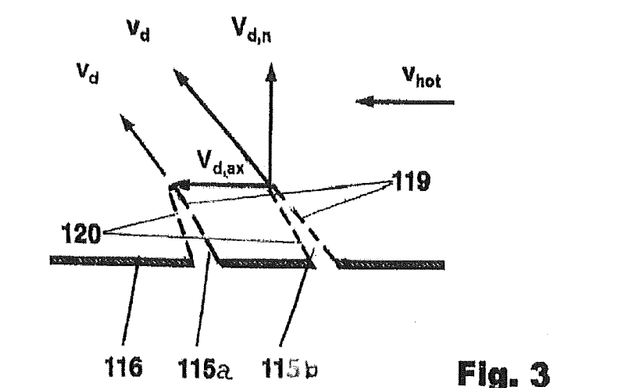
FIG. 3 shows a wall section of a mixer with first and second injection pipes inclined in the direction of the hot gas flow.

FIG. 3 shows a wall section of a mixer 117 with inclined first and second injection pipes 115a, 115b. The first and second injection pipes 115a, 115b are inclined in the direction of the hot gas flow for reducing the pressure drop of the first and second injection pipes 115a, 115b. Preferably the inclination has an angle such that the dilution air leaving the pipes has an axial flow component $v_{d,ax}$ in the direction of the hot gas flow at the location of injection, which is equal to the flow velocity v of the hot gas 109.

The dilution air 110 leaves the injection pipe 114, 115 with a velocity of dilution air $v_d$. This has the component in direction of the hot gas flow with an axial velocity of dilution air $v_{d,ax}$ and a flow component normal to the hot gas flow which has a velocity of dilution air normal to the hot gas flow $v_{d,n}$. The velocity of dilution air normal to the hot gas flow $v_d$ facilitates penetration of the dilution air into the hot gas flow and mixing with the hot gas flow.

According to the example of FIG. 3 a thermal barrier coating (TBC) 119 is applied to the upstream side of the injection pipes 114, 115 to reduce their temperature. The TBC coating can be applied for example on a section of the upstream half or around the whole injection pipe 114, 115. In addition cooling holes 120 are applied on the downstream side. Besides cooling the injection pipe wall, the cooling air ejected from these injection holes 120 is injected into the wake of the injection pipes 114, 115 and thereby reduces the pressured drop in the hot gas flow.

Figure 4:
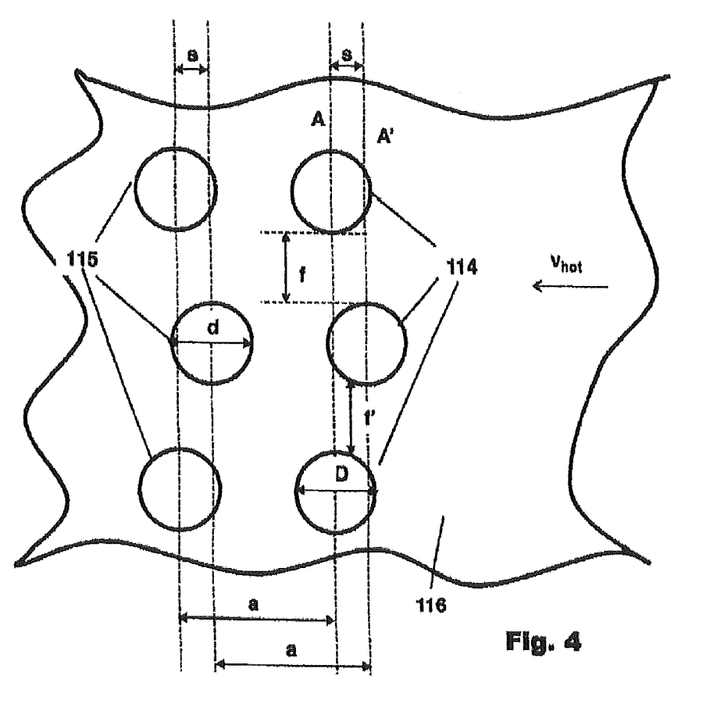
FIG. 4 shows a section of mixer side wall with staggered first and second injection pipes.

FIG. 4 shows a top view of cut-out section the side wall 116 of a mixer 117 with staggered first and second injection pipes 114, 115 having a diameter D. The first injection pipes are arranged in a plane A respectively a plane A' which is normal to the flow direction of the hot gases.

The first injection pipes are staggered by a stagger s, i.e. the plane A is arranged at a distance s in flow direction relative to the plane A'. Due to the stagger the free distance f between two adjacent first injection pipes 114 is increased compared to the free distance f between two adjacent injection pipes which are not staggered.

The second injection pipes 115 are arranged with the same stagger s downstream of the first injection pipes 114 with a distance a between first and a second injection pipes 114, 115. In the example shown, the diameter d of the second injection pipes 115 is equal to the diameter D of the first injection pipes 114.

Figure 5:
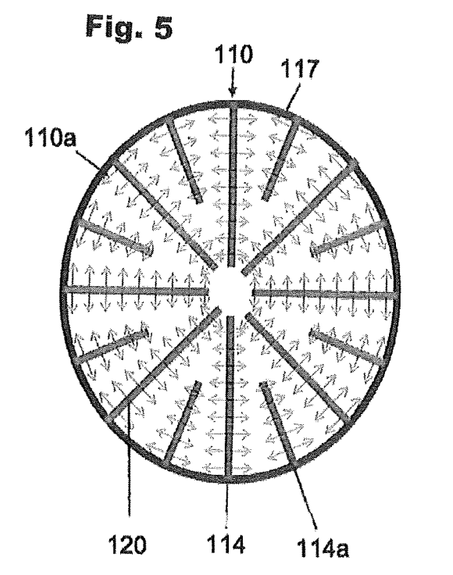
FIG. 5 shows a cross section of a mixer comprising a series of injection pipes mounted circumferentially and extending in radial direction.

FIG. 5 shows a preferred embodiment of the invention in which a series of injection pipes 114, 114a is mounted radially and fed by another plenum with dilution air 110. In the figure the hot gas flow generated by the first combustor flows through the radially disposed long injection pipes 114 and through the intermediate disposed short injection pipes 114a.

Both, the long and the short injection pipes are directed radially towards the center of the mixer 117, wherein the long injection pipes 114 extending nearly to the center of the mixer. The disposition of the injection pipes 114, 114a in the circumferential direction of the mixer is uniformly provided, wherein a non-uniform distribution is also possible. The injection pipes 114, 114a are also equipped with a large number of injection holes 120 used to inject the flowed dilution air 110a into the hot gas flow 109. The key feature of this mixer 117 reflects a good distribution of such injection holes 120 along the respective radial extension of the injection pipes 114, 114a, so that the dilution air 110 is pre-distributed and therefore requiring a much shorter mixing time and length. In summary, the injection pipes, characterized by conical or other geometries, are arranged to cover the full cross sectional area with dilution air being injected orthogonal or quasi-orthogonal into the hot gas flow.

Figure 6:
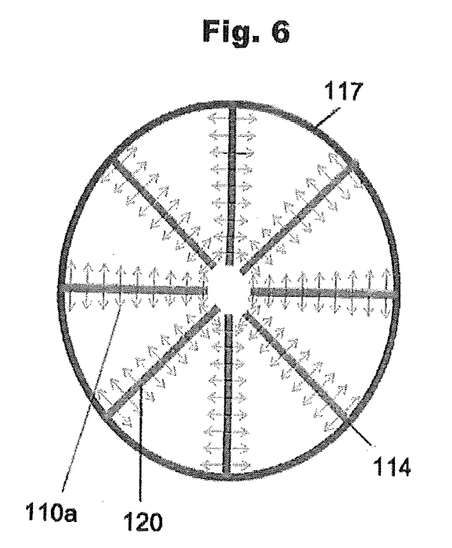
FIG. 6 shows a further cross section of a mixer.

FIG. 6 shows a baseline of a further preferred embodiment of the invention in which a series of injection pipes 114 are mounted radially and fed by another plenum with dilution air 110. In the Figure the hot gas flow generated by the first combustor flows through the radially disposed long injection pipes 114, which have an uniform length. Accordingly, the injection pipes 114, as shown, are directed radially towards the center of the mixer 117, and they extend nearly until the center of the mixer. The disposition of the injection pipes 114 in the circumferential direction of the mixer is uniformly provided, wherein a non-uniform distribution is also possible. The injection pipes 114 are also equipped with a large number of injection holes 120, used to inject the dilution air 110a into the hot gas flow 109. The key feature of this mixer 117 reflects a good distribution of such injection holes 120 along the respective radial extension of the injection pipes 114, so that the dilution air 110 is pre-distributed and therefore requiring a much shorter mixing time and length. In summary, the injection pipes, characterized by conical or other geometries, are arranged to cover the full cross sectional area with dilution air being injected orthogonal or quasi-orthogonal into the hot gas flow All injection pipes may possess the same length.

Figure 7:
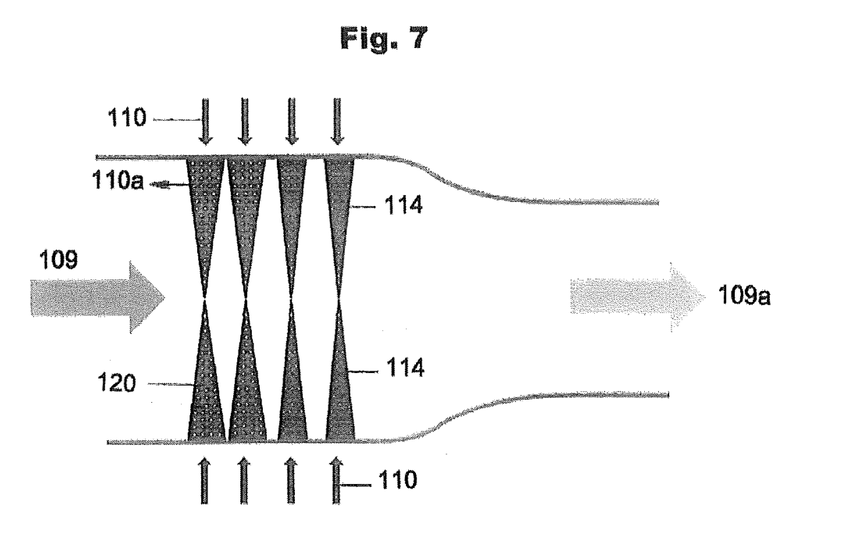
FIG. 7 shows a longitudinal section of the mixer with multiple rows of conical injection pipes staggered to each other.

FIG. 7 shows more rows of injection pipes 114 disposed along the hot gas flow (inlet 109, mixer outlet 109a). The shown injection pipes extend to approximately the center of the mixer 117 and are arranged in radial direction inversely to each other.

Figure 8A:
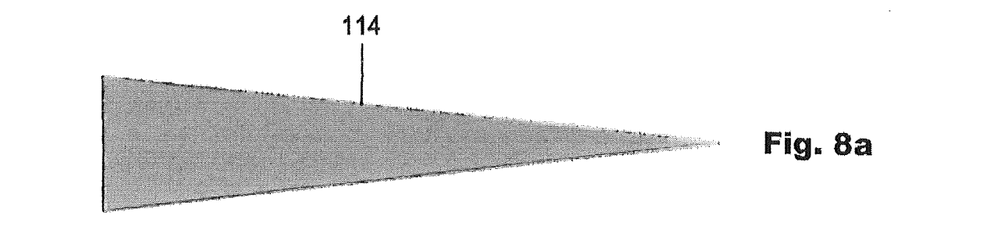
FIG. 8a shows a conical injection pipe.
Figure 8B:
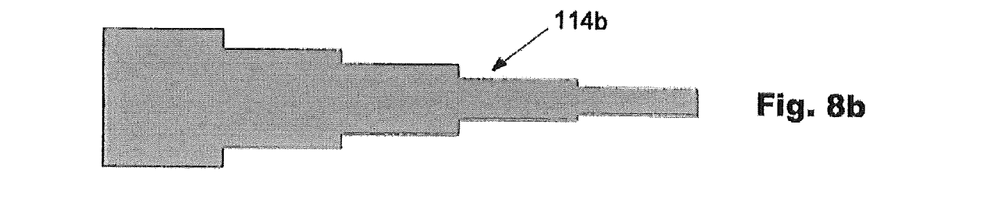
FIG. 8b shows an arrangement of multiple injection pipes welded together to simulate a conical shape.

FIG. 8a shows a single conical injection pipe 114, while FIG. 8b shows another injection pipe 114b composed of multiple tubes welded together to simulate a conical shape. Given the large amount of dilution air 110 to be injected, permanent cylindrical injection pipes would clearly obstruct a large portion of the hot gas flow through the cross sectional area creating a high pressure drop with a lot of disadvantages for the gas turbine engine. In the same time the velocity in the injection pipes would decrease while dilution air is being injected.

For this reason in the present embodiment of the invention, conical or quasi-conical injection pipes 114, 114b are thought to solve both issues. With conical or quasi-conical injection pipes the blockage area can be substantially reduced. The conicity or cross-sectional gradation in longitudinal direction of the respective injection pipes should be chosen so that the dilution air velocity inside the injection pipes is maintained constantly or quasi constantly within a minimal variation. In summary, in another embodiment instead of permanent conical injection pipes (see FIG. 8a), injection pipes with discrete changes in their cross-sectional area are proposed (see FIG. 8b), aiming at easier and cheaper manufacturing.

Figure 9A:
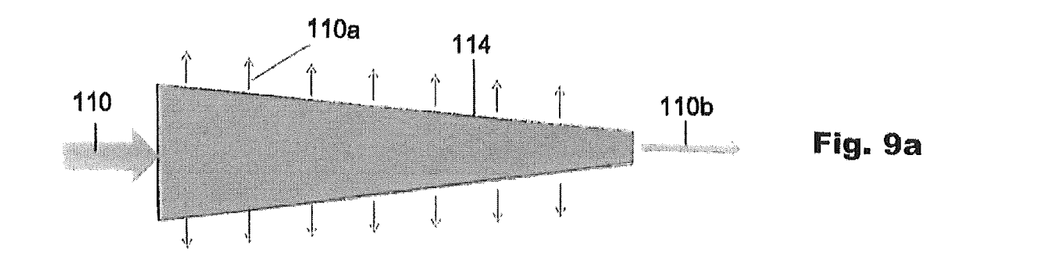
FIG. 9a shows a conical injection pipe with open end.
Figure 9B:
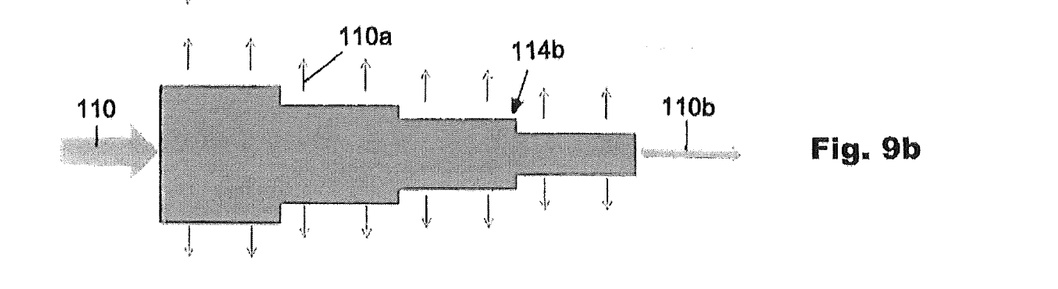
FIG. 9b shows an arrangement of multiple injection pipes welded together to simulate a conical shape with open end.

FIGS. 9a and 9b show the same injection pipes 114, 114b as shown in FIGS. 8a and 8b, with the only difference that they possess at the end an aperture, from which a part of the dilution air 110b is flowing into hot gas flow.

Figure 10:
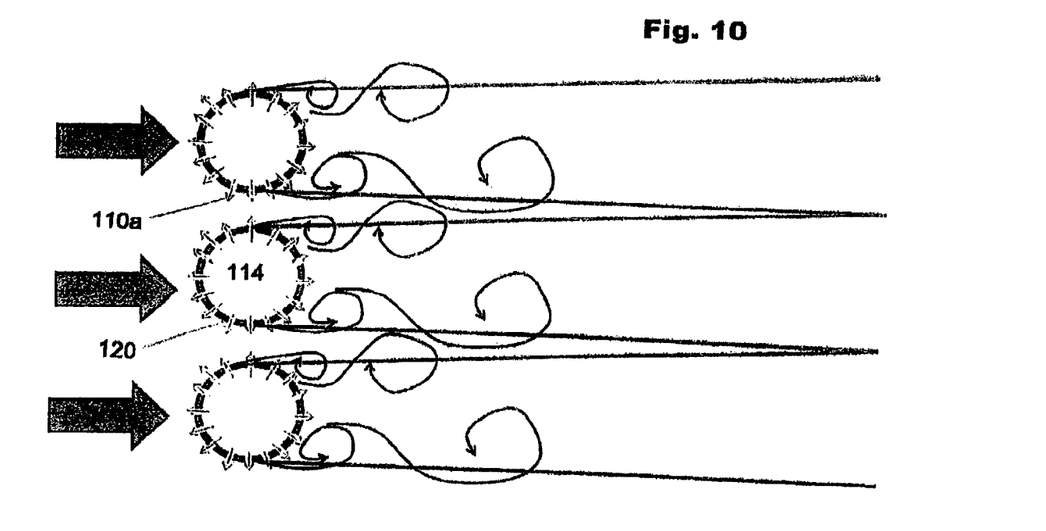
FIG. 10 shows injection holes of the injection pipes with a mitigation against hot gas injection.
Figure 11:
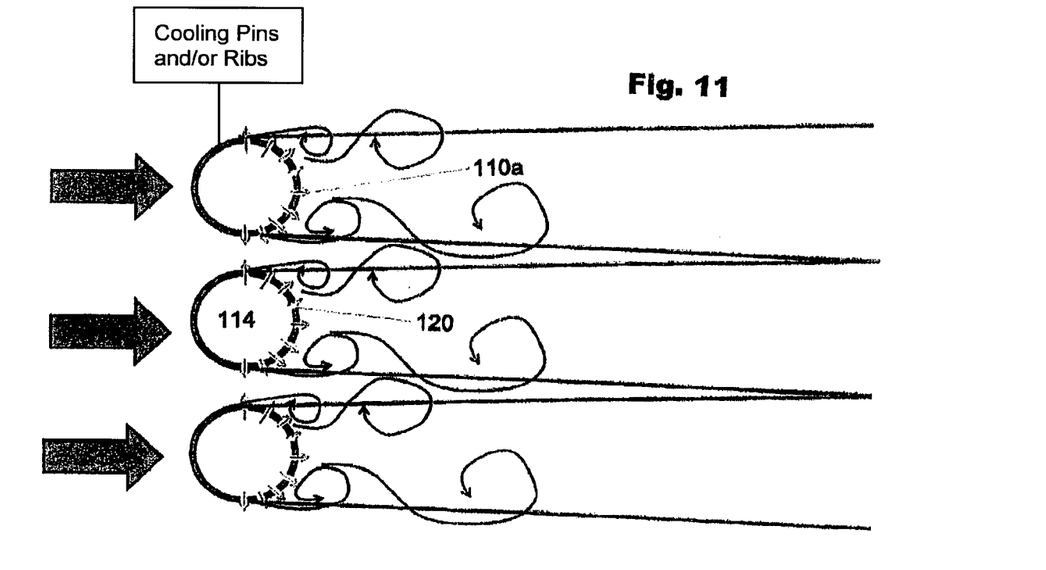
FIG. 11 shows injection holes of the injection pipes with a mitigation against hot gas injection and with convectively cooled leading edge.

FIGS. 10 and 11 show two different solutions referring to the injection holes of the dilution air. While the injection pipes 114 according to FIG. 10 have an integral cover with injection holes 120, the injection pipes according to FIG. 11 are only partially equipped with injection holes: The corresponding solution is related to the aimed mitigation against hot gas injection.

The invention claimed is:

1. A sequential combustor, comprising:
a first burner;
a first combustion chamber;
a mixer for admixing a dilution gas or air to hot gases leaving the first combustion chamber during operation;
a second burner; and
a second combustion chamber arranged sequentially in a fluid flow connection, wherein the mixer is adapted to guide combustion gases in a hot gas flow path including a duct having an inlet at an upstream end connected to the first combustion chamber and an outlet at a downstream end connected to the second burner, wherein the mixer includes at least one group of injection pipes protruding inwards into the hot gas flow path from a side wall of the mixer for admixing the dilution gas or air to cool the hot gases leaving the first combustion chamber wherein the at least one group of injection pipes are arranged circumferentially along the side wall of the mixer and wherein a portion of each injection pipe of the at least one group of injection pipes is arranged in the hot gases and has a quasi-conical shape, with a circumference of each injection pipe decreasing towards a center of the mixer and each injection pipe extending toward the center of the mixer, and wherein each injection pipe of the at least one group of the injection pipes consists of multiple tubes joined end-to-end and forming a stepped configuration with the multiple tubes having successively decreasing cross-sectional area along the radial length of the injection pipe toward the center of the mixer, thereby defining the quasi-conical shape of each injection pipe.

2. The sequential combustor according to claim 1, wherein the at least one group of injection pipes are arranged at intervals to cover the full cross-sectional area of the mixer with the dilution gas or air being injected into the hot gas flow path.

3. The sequential combustor according to claim 1, wherein a plurality of injection holes used to inject the dilution gas or air orthogonally into the hot gas flow path are arranged along a length of each injection pipe of the at least one group of injection pipes.

4. The sequential combustor according to claim 1, wherein each injection pipe of the at least one group of injection pipes possess at an end an aperture, from which a part of the dilution gas or air escapes into hot gas flow path.

5. The sequential combustor according to claim 1, wherein the at least one group of injection pipes includes at least one row of injection pipes with equal, similar or different protrusion depth.

6. The sequential combustor according to claim 1, wherein the at least one group of injection pipes includes multiple rows of injection pipes in the direction of the hot gases with equal, similar or different protrusion depth.

7. The sequential combustor according to claim 1, wherein the at least one group of injection pipes are inclined in the direction of the hot gases.

8. The sequential combustor according to claim 1, wherein the side wall of the mixer are at least partly cooled by effusion cooling.

9. The sequential combustor according to claim 1, wherein the at least one group of injection pipes is circumferentially distributed along the side wall of the mixer and has a staggered design relative to a plane normal to a main flow direction of the hot gases flowing through the mixer, wherein the stagger is between 0.1 and 3.5 times the diameter of the injection pipes.

10. The sequential combustor according to claim 1, wherein at least a part of an outer surface of each injection pipe of the at least one group of injection pipes and/or at least a part of an inner surface of the side wall of the mixer is coated with a thermal barrier coating (TBC).

11. The sequential combustor according to claim 1, comprising:
a number of cooling ribs and/or cooling pins are arranged on an inner surface of each injection pipe of the at least one group of injection pipes.

12. The sequential combustor according to claim 1, wherein the at least one group of injection pipes include a first row of injection pipes, a second row of injection pipes and a third row of injection pipes, wherein a protrusion depth of the injection pipes of the first row is closer to the center of the mixer than a protrusion depth of the second row, and the protrusion depth of the second row is closer or farther to the center of the mixer than a protrusion depth of the third row.

13. The sequential combustor according to claim 12, wherein the respective injection pipes of at least one row of the first, second and third rows of injection pipes extend towards the center of the mixer and are arranged to extend in opposite radial directions.

14. A method for operating a gas turbine, including at least one compressor, a sequential combustor having a first burner, a first combustion chamber, a mixer for admixing a dilution gas or air to hot gases leaving the first combustion chamber, a second burner, and a second combustion chamber, being arranged sequentially in a fluid flow direction, a hot gas flow path including a duct having an inlet at an upstream end connected to the first combustion chamber and an outlet at a downstream end connected to the second burner, wherein the mixer has at least one group of injection pipes protruding radially inwards into the hot gas flow path from side walls of the mixer, wherein the at least one group of injection pipes are arranged circumferentially along the side walls of the mixer and wherein a portion of each injection pipe of the at least one group of injection pipes is arranged in the hot gases and has a quasi-conical shape, with a circumference of each injection pipe decreasing towards a center of the mixer and each injection pipe extending to the center of the mixer, wherein each injection pipe of the at least one group of the injection pipes consists of multiple tubes joined end-to-end and forming a stepped configuration with the multiple tubes having successively decreasing cross-sectional area along the radial length of the injection pipe toward the center of the mixer thereby defining the quasi-conical shape of each injection pipe, the method comprising:

admixing the dilution gas or air with the hot gases leaving the first combustion chamber in the hot gas flow path using the at least one group of injection pipes of the mixer to inject the dilution gas or air into the hot gas flow path to cool the hot gases leaving the first combustion chamber.

* * * * *